United States Patent
Tsuchiyama (10) Patent No.: US 11,312,223 B2
(45) Date of Patent: Apr. 26, 2022

(54) VEHICLE CONTROLLER CONFIGURED TO EXECUTE A DUTY CYCLE CONTROL PROCESS WHEN DETERMINING THAT AN ANOMALY HAS OCCURRED

(71) Applicant: TOYOTA JIDOSHA KABUSHIKI KAISHA, Toyota (JP)

(72) Inventor: Makio Tsuchiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 16/395,312

(22) Filed: Apr. 26, 2019

(65) Prior Publication Data

US 2019/0366827 A1 Dec. 5, 2019

(30) Foreign Application Priority Data

May 29, 2018 (JP) .............................. JP2018-102300

(51) Int. Cl.
*B60K 6/26* (2007.10)
*B60K 6/24* (2007.10)
(Continued)

(52) U.S. Cl.
CPC ................ *B60K 6/26* (2013.01); *B60K 6/24* (2013.01); *B60K 6/28* (2013.01); *B60L 50/16* (2019.02);
(Continued)

(58) Field of Classification Search
CPC .... B60K 6/26; B60K 6/24; B60K 6/28; B60L 50/16; B60L 240/421; F02M 2026/005;
(Continued)

(56) References Cited

U.S. PATENT DOCUMENTS

2012/0320649 A1* 12/2012 Hamanaka ................ B60L 3/04
363/131
2013/0305692 A1* 11/2013 Hashimoto ........... F01N 3/2013
60/274

(Continued)

FOREIGN PATENT DOCUMENTS

CA 2559291 A1 * 3/2007
EP 0570241 A1 * 11/1993 ............... B60K 6/46
(Continued)

OTHER PUBLICATIONS

Translated specification of Yamanashi (Year: 1996).*

*Primary Examiner* — James M McPherson
*Assistant Examiner* — Kyle J Kingsland
(74) *Attorney, Agent, or Firm* — Oliff PLC (57) ABSTRACT

A vehicle controller is configured to execute a duty cycle control process of alternately repeating an electric power generation execution period and an electric power generation stop period of an electric generator and controlling a duty cycle, which is a ratio of the electric power generation execution period to a single cycle of repeated cycles, when determining that an anomaly has occurred in a driving circuit. The duty cycle control process includes at least one of two processes, a process of setting the duty cycle to be larger when a member in an overheatable region, in which overheating is possibly performed by the heater, has a low temperature than when the member has a high temperature and a process of setting the duty cycle to be larger when an internal combustion engine has a large intake air amount than when the engine has a small intake air amount.

12 Claims, 4 Drawing Sheets

(51) Int. Cl.
  *B60L 50/16*  (2019.01)
  *B60K 6/28*  (2007.10)
  *F02M 26/00*  (2016.01)
(52) U.S. Cl.
  CPC .. *B60L 2240/421* (2013.01); *F02M 2026/005* (2016.02)
(58) Field of Classification Search
  CPC ............ F01N 2550/22; F01N 2240/16; F01N 3/2013; F02D 41/0077
  See application file for complete search history.

(56) References Cited

U.S. PATENT DOCUMENTS

2014/0360162 A1* 12/2014 Gonze .................. F01N 3/2013
  60/274
2020/0240307 A1* 7/2020 Matsumura ............ B01D 53/94

FOREIGN PATENT DOCUMENTS

| EP | 3075977 A1 | * | 10/2016 | ............. F01N 3/208 |
| JP | 08326527 A | * | 12/1996 | |
| JP | 2009-227038 A | | 10/2009 | |

* cited by examiner

VEHICLE CONTROLLER CONFIGURED TO EXECUTE A DUTY CYCLE CONTROL PROCESS WHEN DETERMINING THAT AN ANOMALY HAS OCCURRED

BACKGROUND

1. Field

The following description relates to a vehicle controller configured to control a vehicle that includes an internal combustion engine capable of transmitting rotational power of a crankshaft to a driven wheel, a catalyst arranged in an exhaust passage of the internal combustion engine, a heater that generates heat by consuming electric power with the catalyst as a subject to be heated, a driving circuit that supplies the heater with electric power of a battery, and an electric generator that converts the rotational power of the crankshaft into electric power and supplies the driving circuit with the electric power.

2. Description of Related Art

Japanese Laid-Open Patent Publication No. 2009-227038 discloses an example of a vehicle including a controller. In the electric power generated by the motor generator, the controller controls the amount of electric power supplied to a heater that heats a catalyst (electrically heated catalyst: EHC).

When an anomaly has occurred in the controller, the motor generator and the EHC are constantly energized and the EHC and the battery, which charges the electric power generated by the motor generator, are constantly energized. In this case, the EHC and a member located proximate to the EHC, such as the catalyst, may excessively increase in temperature.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example 1: A vehicle controller is configured to control a vehicle. The vehicle includes an internal combustion engine capable of transmitting rotational power of a crankshaft to a driven wheel, a catalyst arranged in an exhaust passage of the internal combustion engine, a heater configured to generate heat by consuming electric power with the catalyst as a subject to be heated, a driving circuit configured to supply the heater with electric power of a battery, a breaking circuit configured to break an electrical path between the battery and the driving circuit, and an electric generator configured to convert the rotational power of the crankshaft into electric power and supply the driving circuit with the electric power. The vehicle controller is configured to execute an anomaly determination process of determining whether an anomaly where power is constantly supplied from the battery to the heater has occurred in the driving circuit and a breaking process of breaking the electrical path by operating the breaking circuit when determining that the anomaly has occurred in the driving circuit. The vehicle controller is also configured to execute a duty cycle control process of alternately repeating an electric power generation execution period, during which the electric generator generates power, and an electric power generation stop period, during which the electric generator does not generate power, and controlling a duty cycle, which is a ratio of the electric power generation execution period to a single cycle of repeated cycles, when determining that the anomaly has occurred in the driving circuit, and the duty cycle control process includes at least one of two processes, which are a process of setting the duty cycle to be larger when a member in an overheatable region, in which overheating is possibly performed by the heater, has a low temperature than when the member has a high temperature and a process of setting the duty cycle to be larger when the internal combustion engine has a large intake air amount than when the internal combustion engine has a small intake air amount.

When an anomaly where power is constantly supplied from the battery to the heater has occurred in the driving circuit, the supply of power from the battery cannot be controlled. Thus, the amount of heat generated by the heater may not be able to be controlled. Consequently, this may excessively increase the temperature in the member located proximate to the heater such as the catalyst, which is subject to heating. Thus, in the above-described configuration, when an anomaly has occurred in the driving circuit, the electrical path between the battery and the heater is broken. This prevents the constant supply of electric power from the battery to the heater. Thus, as compared to when the electrical path is not broken, an excessive increase is limited in the temperature of the member located proximate to the heater. However, when the electric generator stops generating electric power, auxiliary devices such as the heater, which has the battery as the power supply, cannot supply electric power. Thus, when the breaking process is executed, the supply of electric power may be inadequate.

In the above-described configuration, the electric generator controls the generation of electric power to change the duty cycle in accordance with the intake air amount and the temperature of the member located proximate to the heater. The flow rate of fluid in the exhaust passage that takes heat from the member located proximate to the heater is larger when the intake air amount is large than when the intake air amount is small. This increases the upper limit value electric power that can be supplied to the heater. Further, the temperature of the member located proximate to the heater is more sufficient when the temperature of the member located proximate to the heater is low than when the temperature is high. This increases the upper limit value of electric power that can be supplied to the heater. Accordingly, setting the duty cycle in accordance with the intake air amount increases the amount of electric power generated by the electric generator while limiting an excessive increase in the temperature of the member located proximate to the heater.

Example 2: In the vehicle controller according to example 1, the battery is a high-voltage battery. The vehicle includes a low-voltage battery having a lower terminal voltage than the high-voltage battery and a step-down converter configured to step down an output voltage at the electric generator and apply the output voltage to the low-voltage battery. The step-down converter is capable of outputting electric power to the low-voltage battery when a terminal voltage at the electric generator is greater than or equal to an operation ensuring lower limit voltage. The duty cycle control process includes setting the duty cycle such that the output voltage at the electric generator in the electric power generation execution period is greater than or equal to the operation ensuring lower limit voltage.

In the above-described configuration, the output voltage of the electric generator during the electric power generation execution period is set to be greater than or equal to the operation ensuring lower limit voltage. This allows the step-down converter to supply the low-voltage battery with generated electric power.

Example 3: In the vehicle controller according to example 1 or 2, the vehicle includes a torque converter connected to the crankshaft and provided with a lock-up clutch. The vehicle controller is configured to execute a disengagement process of setting the lock-up clutch to a disengaged state when determining that the anomaly has occurred in the driving circuit.

For example, in a case in which the power of the crankshaft drives the driven wheel, when the lock-up clutch is set to the disengaged state, the rotational speed of the crankshaft tends to increase by an amount of slipping of the crankshaft toward the output side of the torque converter. Thus, in the above-described configuration, when it is determined that an anomaly has occurred in the driving circuit, the lock-up clutch is set to the disengaged state. In this case, as compared to when the lock-up clutch is set to the engaged state, control of intending to increase the rotational speed of the crankshaft is performed. The flow rate of fluid in the exhaust passage that takes the heat of the member located proximate to the heater increases to a larger extent when the rotational speed is high than when the rotation speed is low. Thus, as compared to when the disengagement process is set to the engaged state, the electric generator generates a large amount of electric power.

Example 4: In the vehicle controller according to example 3, the vehicle controller is configured to execute a fuel cut-off process of stopping combustion control in the internal combustion engine on a condition that an accelerator operation amount is zero and a stop process of stopping the disengagement process in a case in which the fuel cut-off process has been executed even when determining that the anomaly has occurred in the driving circuit.

When the fuel cut-off process is executed, the rotational speed of the crankshaft decreases. The speed decrease occurs at a higher pace when the lock-up clutch is disengaged than when the lock-up clutch is engaged. In the above-described configuration, when the fuel cut-off process is executed, the disengagement process is stopped to limit a decrease in the rotational speed of the crankshaft and limits a decrease in the flow rate of exhaust gas that takes the heat of the member located proximate to the heater. Thus, as compared to when the disengagement process is continued, the electric generator generates a large amount of electric power.

Example 5: In the vehicle controller according to any one of examples 1 to 4, the vehicle controller is configured to execute an idling process of controlling a rotational speed of the crankshaft of the internal combustion engine to a target rotational speed when an accelerator operation amount is zero. The vehicle controller is also configured to execute a setting process of setting the target rotational speed to be a larger value when determining that the anomaly has occurred in the driving circuit than when determining that the anomaly has not occurred in the driving circuit. The vehicle controller is further configured to execute an amount decreasing process of decreasing an amount of fuel injected from a fuel injection valve of the internal combustion engine to a larger extent in a case in which the idling process is stopped to switch to control corresponding to the accelerator operation amount when determining that the anomaly has occurred in the driving circuit than in a case in which the idling process is stopped to switch to control corresponding to the accelerator operation amount when determining that the anomaly has not occurred in the driving circuit.

The flow rate of exhaust gas that takes heat from the member located proximate to the heater is smaller when the idling process is executed than when the idling process is not executed. In the above-described configuration, when it is determined that an anomaly has occurred in the driving circuit, the target rotational speed is set to a large value to maximize the flow rate of exhaust gas that takes heat from the member located proximate to the heater. Thus, as compared to when the target rotational speed is not increased, the electric generator generates a large amount of electric power.

However, the driving force of the vehicle is larger when the idling process is not performed in a case in which the target rotational speed is increased than in which the target rotational speed is not increased. This may make the user feel strange. In the above-described configuration, the amount decreasing process is performed to set a small amount of fuel when the idling process is not performed. As compared to the normal time, this limits an increase in the driving force of the vehicle when the idling process is not performed.

Example 6: In the vehicle controller according to any one of examples 1 to 5, the internal combustion engine includes an EGR passage configured to cause exhaust gas discharged to the exhaust passage to flow into an intake passage and an EGR valve configured to adjust a cross-sectional flow area of the EGR passage. The catalyst is a selective catalytic reduction catalyst. The vehicle includes a urea solution addition valve configured to add urea solution to exhaust gas in a section located at an upstream side of the catalyst. The vehicle controller is configured to execute a valve operation process of operating the EGR valve in order to set an EGR ratio to be smaller when determining that the anomaly has occurred in the driving circuit than when determining that the anomaly has not occurred in the driving circuit and an amount increasing process of increasing an amount of the urea solution added from the urea solution addition valve to a larger extent when the valve operation process is executed than when the valve operation process is not executed.

In the above-described configuration, when it is determined that an anomaly has occurred in the driving circuit, the concentration of NOx in exhaust gas is increased by reducing the EGR ratio. This increases the amount of urea solution in which NOx should be reduced in the catalyst. Thus, the amount increasing process is executed. This allows the urea solution to take the heat generated by the heater and thus limits an excessive increase in the temperature of the member located proximate to the heater. Accordingly, as compared to when the amount increasing process is not performed, the electric generator generates a large amount of electric power.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle controller 80 according to a first embodiment will now be described with reference to the drawings.

Figure 1:
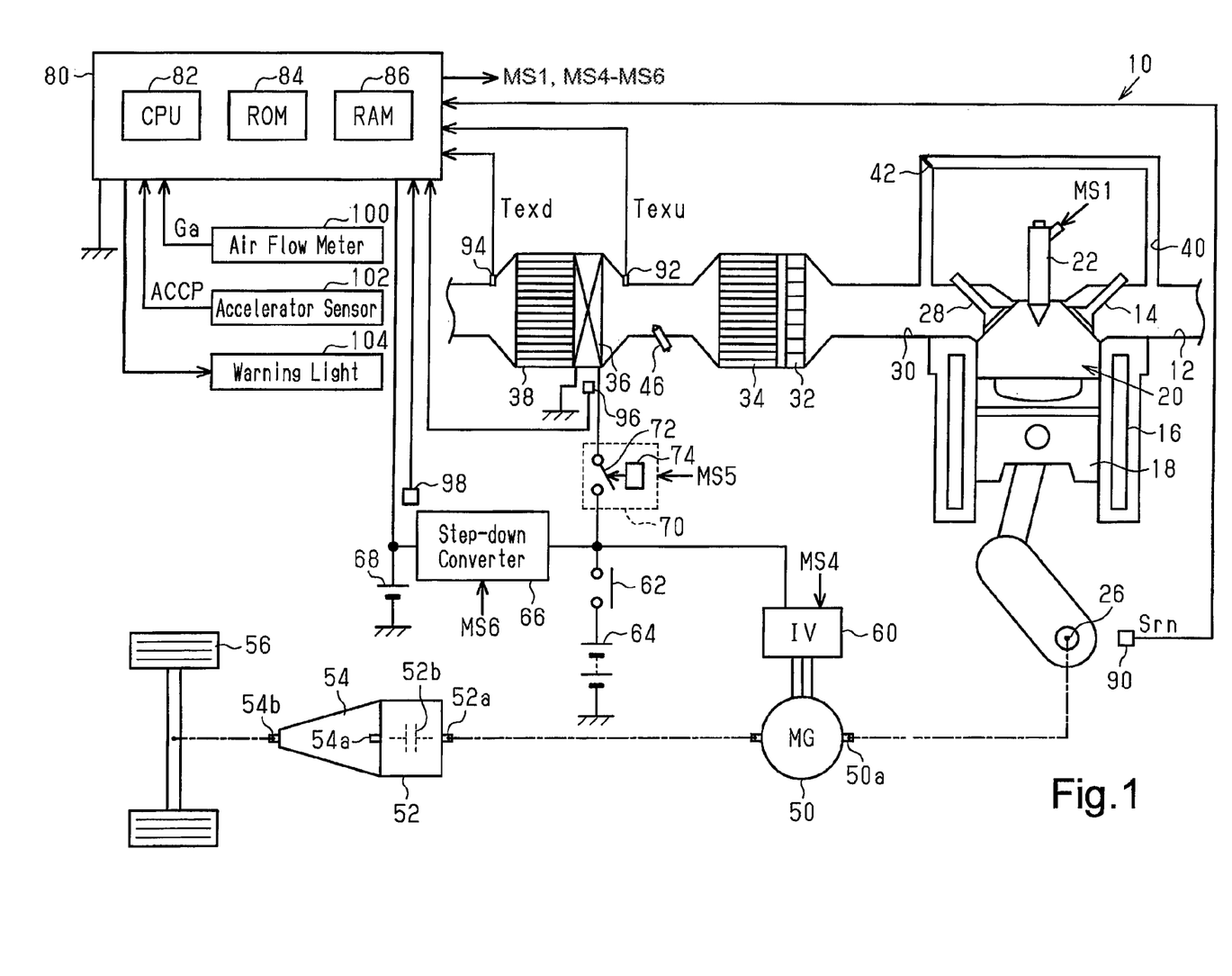
FIG. 1 is a diagram showing part of a vehicle controller and a drive system of a vehicle according to a first embodiment.

In an internal combustion engine 10 shown in FIG. 1, air drawn from an intake passage 12 flows, as an intake valve 14 opens, into a combustion chamber 20 defined by a cylinder 16 and a piston 18. Fuel such as diesel fuel is injected into the combustion chamber 20 from a fuel injection valve 22. A mixture of air and fuel in the combustion chamber 20 is ignited and burned when compressed. The energy generated by the combustion of the air-fuel mixture is converted into rotational energy of a crankshaft 26 by the piston 18. The burned mixture is discharged as an exhaust gas into an exhaust passage 30 as an exhaust valve 28 opens. The exhaust passage 30 includes an oxidation catalyst 32 and a diesel particulate filter (DPF) 34 for collecting particulate matter arranged at the downstream side of the oxidation catalyst 32. The exhaust passage 30 also includes a heater, namely, an electrically heated catalyst (hereafter referred to as "EHC") 36, arranged at the downstream side of the DPF 34. A selective catalytic reduction catalyst (hereafter referred to as "SCR catalyst") 38 is arranged at the downstream side of the EHC 36. The subject to be heated by the EHC 36 is the SCR catalyst 38.

The upstream side of the oxidation catalyst 32 in the exhaust passage 30 is connected to the intake passage 12 via an EGR passage 40. The EGR passage 40 includes an EGR valve 42 configured to adjust the cross-sectional flow area of the EGR passage 40. Further, a urea solution addition valve 46 configured to add urea solution to the exhaust gas is arranged between the DPF 34 and the EHC 36 in the exhaust passage 30.

A rotation shaft 50a of a motor generator 50 is mechanically connectable to the crankshaft 26. In the present embodiment, a three-phase rotating electrical machine is used as the motor generator 50. The rotation shaft 50a of the motor generator 50 is mechanically connected to an input shaft 52a of a torque converter 52. The torque converter 52 transmits rotation of the input shaft 52a to an input shaft 54a of a transmission 54. An output shaft 54b of the transmission 54 is mechanically connected to driven wheels 56.

Voltages of phases in a three-phase inverter 60 are applied to corresponding three-phase terminals of the motor generator 50. The three-phase inverter 60 is an electric power converter circuit that converts a direct-current voltage of a high-voltage battery 64, which serves as a direct-current voltage supply, into an alternating-current voltage and outputs the resulting voltage. In the present embodiment, the high-voltage battery 64 includes a lithium-ion rechargeable battery. The terminal voltage at the high-voltage battery 64 is, for example, approximately 48 V. A relay 62 is arranged between the high-voltage battery 64 and the three-phase inverter 60.

Electric power of the high-voltage battery 64 is supplied to a driving circuit 70 configured to drive the EHC 36. The driving circuit 70 includes a switching element 72 and a control IC 74. The switching element 72 opens and closes a loop path formed by the high-voltage battery 64 and the EHC 36 including the relay 62. The control IC 74 turns on and off the switching element 72. The control IC 74 uses an operation signal MS5 from the outside to adjust the duty cycle of an ON-time for a single cycle during which the switching element 72 is turned on and off.

Further, a step-down converter 66 steps down the voltage at the high-voltage battery 64 and applies the resulting electric power to a low-voltage battery 68. The step-down converter 66 operates when the applied voltage is greater than or equal to an operation ensuring lower limit voltage Vth. In the present embodiment, the operation ensuring lower limit voltage Vth has a value that is slightly lower than the terminal voltage at the high-voltage battery 64 (for example, 45 V). In the present embodiment, the low-voltage battery 68 includes a lead-acid battery. The terminal voltage at the low-voltage battery 68 is, for example, approximately 12 V.

The vehicle controller 80 is configured to control the internal combustion engine 10. The vehicle controller 80 operates units operated in the internal combustion engine 10 such as the fuel injection valve 22, the EGR valve 42, the driving circuit 70 for the EHC 36, and the urea solution addition valve 46 in order to control the control amount (such as torque or exhaust component ratio) of the internal combustion engine 10. Further, the vehicle controller 80 is configured to control the motor generator 50. The vehicle controller 80 operates the three-phase inverter 60 in order to control the control amount (such as output) of the motor generator 50. The vehicle controller 80 is powered by the low-voltage battery 68.

When controlling the control amount, the vehicle controller 80 refers to an output signal Srn of a crank angle sensor 90, the temperature of the exhaust gas flowing into the EHC 36 (upstream exhaust temperature Texu) detected by an upstream exhaust temperature sensor 92, and the temperature of the exhaust gas flowing out of the SCR catalyst 38 (downstream exhaust temperature Texd) detected by a downstream exhaust temperature sensor 94. Further, the vehicle controller 80 refers to voltage Vehc applied to the EHC 36 by the driving circuit 70 and detected by a voltage sensor 96 and a charging/discharging current I of the low-voltage battery 68 detected by a current sensor 98. The vehicle controller 80 refers to an intake air amount Ga of the internal combustion engine 10 detected by an air flow meter 100 and an accelerator operation amount ACCP detected by an accelerator sensor 102. The vehicle controller 80 includes a CPU 82, a ROM 84, and a RAM 86. The vehicle controller 80 controls the above control amount when the CPU 82 executes a program stored in the ROM 84.

For example, when the CPU 82 makes a deceleration determination in which the accelerator operation amount ACCP is less than or equal to a specified value, the CPU 82 has the motor generator 50 control electric power generation to transmit load torque to the crankshaft 26. Further, the CPU 82 has the EHC 36 perform heating control such that the temperature of the SCR catalyst 38 is a temperature that keeps the NOx reduction rate at a predetermined rate or higher. Furthermore, the CPU 82 is configured to execute a process of addressing an anomaly that has occurred in the driving circuit 70.

Figure 2:
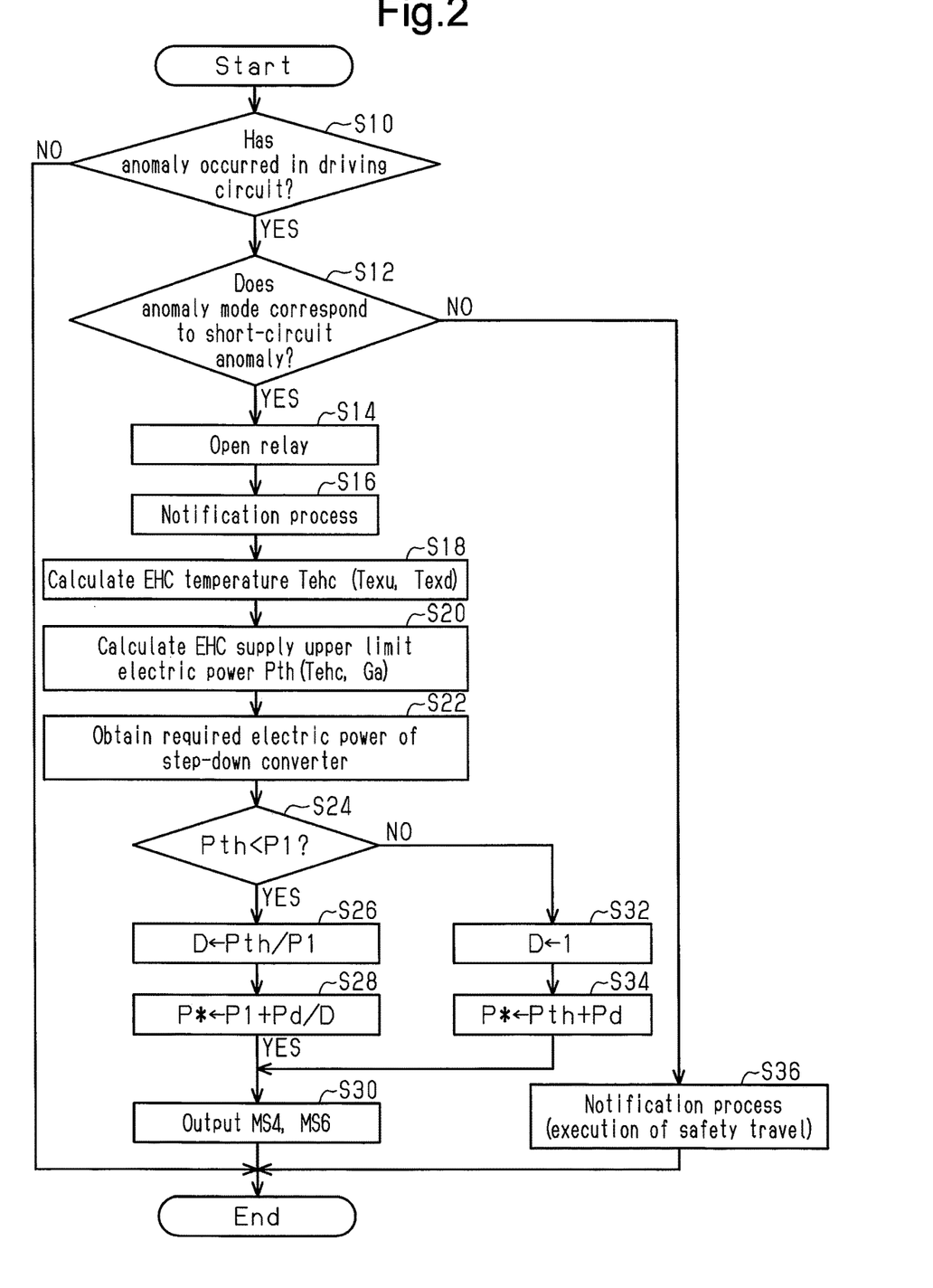
FIG. 2 is a flowchart illustrating a procedure for processes executed by the vehicle controller according to the first embodiment.

FIG. 2 illustrates a procedure for processes for addressing the above-described anomaly. The processes illustrated in FIG. 2 are implemented when the CPU 82 repeatedly executes the program stored in the ROM 84, for example, in a predetermined cycle. In the following description, the step number of each process is represented by a number in front of which the character S is given.

In a series of processes shown in FIG. 2, the CPU 82 first determines whether an anomaly has occurred in the driving circuit 70 (S10). The CPU 82 determines that an anomaly has occurred in the driving circuit 70 when, for example, a mismatch has occurred between the voltage Vehc and the operation signal MS5, which specifies the duty cycle. That is, the CPU 82 determines that an anomaly has occurred in the driving circuit 70 when, for example, the voltage Vehc is fixed at a ground voltage in a case in which a larger value than zero is output as the duty cycle by the operation signal MS5. Also, even if the duty cycle should be zero because there is no output of the operation signal MS5, the CPU 82 determines that an anomaly has occurred in the driving circuit 70 when, for example, the voltage Vehc is fixed at the terminal voltage at the high-voltage battery 64.

When determining that an anomaly has occurred in the driving circuit 70 (S10: YES), the CPU 82 determines whether the anomaly mode corresponds to a short-circuit anomaly, in which the driving circuit 70 constantly applies the voltage at the high-voltage battery 64 to the EHC 36 regardless of the operation of the operation signal MS5 (S12). Even if the duty cycle should be zero because there is no output of the operation signal MS5, the CPU 82 determines that the short-circuit anomaly has occurred when the voltage Vehc is fixed at the terminal voltage at the high-voltage battery 64. When determining that a short-circuit anomaly has occurred (S12: YES), the CPU 82 opens the relay 62 in order to avoid constant application of the voltage at the high-voltage battery 64 to the EHC 36 (S14). Then, the CPU 82 operates a warning light 104, which is shown in FIG. 1, to execute a notification process of notifying the user that an anomaly has occurred (S16).

Subsequently, the CPU 82 calculates the temperature of the EHC 36 (EHC temperature Tehc) based on the upstream exhaust temperature Texu and the downstream exhaust temperature Texd (S18). The CPU 82 sets the EHC temperature Tehc to be a value greater than or equal to the upstream exhaust temperature Texu. The CPU 82 calculates the EHC temperature Tehc to be higher as the downstream exhaust temperature Texd becomes higher.

Afterwards, the CPU 82 calculates an EHC supply upper limit electric power Pth based on the EHC temperature Tehc and the intake air amount Ga (S20). The EHC supply upper limit electric power Pth is an upper limit value above which the amount of electric power generated by the EHC 36 no longer increases excessively as the electric power supplied to the EHC 36. The CPU 82 calculates the EHC supply upper limit electric power Pth to be a larger value when the EHC temperature Tehc is low than when the EHC temperature Tehc is high. This is because an excessive increase in the EHC temperature Tehc is limited even if a large amount of electric power is supplied to the EHC 36 when the EHC temperature Tehc is low as compared to when the EHC temperature Tehc is high. Additionally, the CPU 82 sets the EHC supply upper limit electric power Pth to be a larger value when the intake air amount Ga is larger than when the intake air amount Ga is smaller for the following reason. The flow rate of fluid flowing into the EHC 36 is larger when the intake air amount Ga is large than when the intake air amount Ga is small. This increases the amount of heat taken away from the EHC 36 and the SCR catalyst 38 by exhaust gas and thus limits an excessive increase in the temperatures of the EHC 36 and the SCR catalyst 38.

Then, the CPU 82 calculates a required electric power Pd of the step-down converter 66 (S22). The CPU 82 calculates the required electric power Pd to be a larger value, for example, when the state of charge (SOC) of the low-voltage battery 68 is small than when the SOC is large. The CPU 82 calculates the SOC of the low-voltage battery 68 by performing a multiplication process of the charging/discharging current I.

Subsequently, the CPU 82 determines whether the EHC supply upper limit electric power Pth is smaller than a reference electric power P1 (S24). The reference electric power P1 is the power consumption of the EHC 36 when a specified voltage Vh, which is greater than or equal to the operation ensuring lower limit voltage Vth, is applied to the EHC 36. That is, when a resistance value R of a resistor of the EHC 36 is used, current Iehc flowing into the EHC 36 is represented as Vh/R, and the reference electric power P1 is represented as Vh·Iehc.

The process of S24 is a process of determining whether the electric power generation voltage at the motor generator 50 can continue to be constantly applied to the EHC 36 with the electric power generation voltage fixed at the specified voltage Vh. In the present embodiment, in a case in which the process of S14 is executed, this process is executed under the assumption that the output voltage at the motor generator 50 is controlled to the specified voltage Vh or zero when the motor generator 50 generates electric power in order to ensure operation of the step-down converter 66.

When determining that the EHC supply upper limit electric power Pth is smaller than the reference electric power P1 (S24: YES), the CPU 82 substitutes Pth/P1 into a duty cycle D (S26). The duty cycle D is the ratio of an electric power generation execution period in a single period T, which alternately repeats the electric power generation execution period, during which the electric power generation voltage at the motor generator 50 is set to the specified voltage Vh, and an electric power generation stop period, during which the electric power generation voltage is set to zero. This process is to set the power consumption of the EHC 36 per single period T to the EHC supply upper limit electric power Pth.

Subsequently, the CPU 82 substitutes the sum of the reference electric power P1 and Pd/D into a generated electric power P* in the electric power generation execution period (S28). This process is to set the average value of electric power supplied to the EHC 36 to the EHC supply upper limit electric power Pth and set the average value of electric power supplied to the step-down converter 66 to the required electric power Pd in the single period T.

Afterwards, the CPU 82 operates the three-phase inverter 60 by outputting an operation signal MS4 to the three-phase inverter 60 such that the electric power generated by the motor generator 50 is the generated electric power P* during the electric power generation execution period. Further, the CPU 82 operates the step-down converter 66 by outputting an operation signal MS6 to the step-down converter 66 such that the power consumption of the step-down converter 66 becomes Pd/D (S30). The CPU 82, for example, interprets the charging/discharging current I as an output current of the step-down converter 66 and controls the output current such that Vh·I becomes equal to Pd/D. In order to control the power consumption of the step-down converter 66 during the single period T to Pd/D with high accuracy, it is desired that a switching cycle, which is the inverse of a switching frequency of a switching element of the step-down converter 66, be sufficiently shorter than the single period T. In addition, the CPU 82 controls current flowing to the motor generator 50 such that the product of a rotational speed Nm and a torque Trq of the motor generator 50 becomes the generated electric power P*.

When making a negative determination in the process of S24, the CPU 82 substitutes 1 into the duty cycle D (S32). Subsequently, the CPU 82 substitutes Pth+Pd into the generated electric power P* (S34). Then, the CPU 82 outputs the operation signal MS4 to the three-phase inverter 60 to operate the three-phase inverter 60 such that the electric power generated by the motor generator 50 becomes the generated electric power P*. Further, the CPU 82 outputs the operation signal MS6 to the step-down converter 66 to operate the step-down converter 66 such that the power consumption of the step-down converter 66 is the required electric power Pd (S30).

When determining that the anomaly mode does not correspond to a short-circuit anomaly in the process of S12 (S12: NO), the CPU 82 executes a notification process of notifying the user that an anomaly has occurred (S36). Since an anomaly where electric power cannot be supplied to the EHC 36 has occurred in the EHC 36, it is desired that the operation mode be switched to, for example, a safety travel mode to limit the amount of NOx in exhaust gas.

When completing the process of S30 or S36 or making a negative determination in the process of S10, the CPU 82 ends the series of processes shown in FIG. 2.

The operation and advantages of the present embodiment will now be described.

When a short-circuit anomaly has occurred in the driving circuit 70, the CPU 82 turns off the relay 62 to avoid constant supply of electric power from the high-voltage battery 64 to the EHC 36. Then, the CPU 82 operates the duty cycle D of the electric power generation execution period to the single period T of the electric power generation execution period, during which the motor generator 50 generates electric power, and the electric power generation stop period, during which the motor generator 50 does not generate electric power, based on the EHC supply upper limit electric power Pth.

Figure 3:
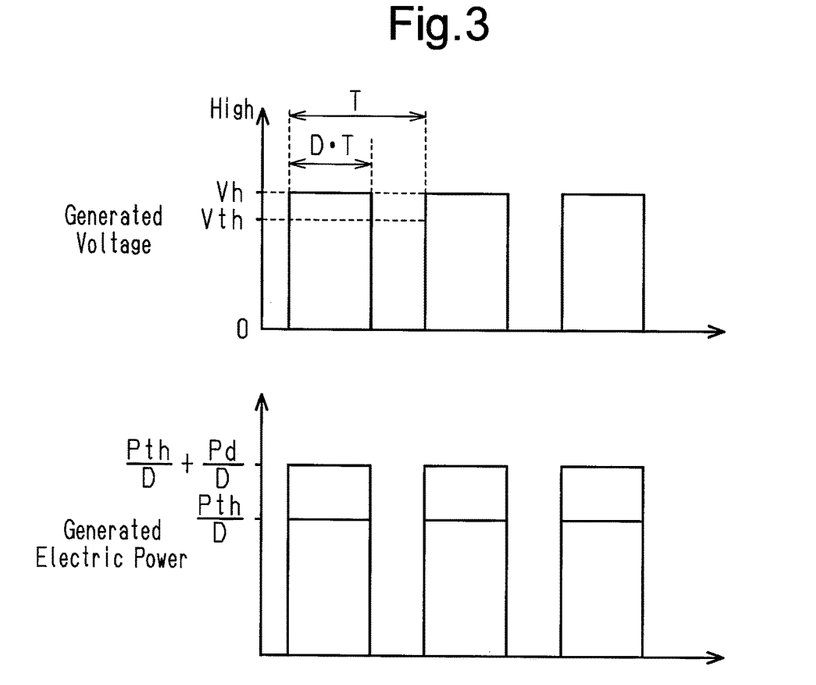
FIG. 3 is a time chart illustrating an electric power generating process according to the first embodiment.

FIG. 3 illustrates that the duty cycle D is smaller than 1.

As shown in FIG. 3, the electric power generation execution period has an interval D·T. During this period, the electric power generation voltage at the motor generator 50 is set to the specified voltage Vh through the above-described control. The electric power generated during this interval is (Pth+Pd)/D. During the electric power generation stop period, the electric power generation voltage at the motor generator 50 is zero and the generated electric power is zero. Thus, during the single period T, the average value of the electric power supplied to the EHC 36 is (Pth/D)·(D·T)/T, which is the EHC supply upper limit electric power Pth. Further, during the single period T, the average value of electric power supplied to the step-down converter 66 is (Pd/D)·(D·T)/T, which is the required electric power Pd. The electric power generation voltage in the electric power generation execution period is the specified voltage Vh, which is larger than the operation ensuring lower limit voltage Vth. This allows the step-down converter 66 to output the generated electric power to the low-voltage battery 68. Thus, the electric power supplied to the step-down converter 66 can be controlled to the required electric power Pd.

Thus, in the present embodiment, when a short-circuit anomaly has occurred in the driving circuit 70, the duty cycle D is set based on the EHC supply upper limit electric power Pth. Accordingly, the control of electric power generation performed by the motor generator 50 can be executed to prevent excessive increases in the temperatures of the EHC 36 and a member located proximate to the EHC 36 such as the SCR catalyst 38, which is a subject to be heated by the EHC 36. In particular, when the duty cycle D is set such that the average power consumption of the EHC 36 is the EHC supply upper limit electric power Pth, the amount of electric power generated by the motor generator 50 can be maximized to prevent an excessive increase in the member located proximate to the EHC 36. Thus, the driver feels the vehicle decelerating as much as possible as compared to when the motor generator 50 cannot generate electric power due to a short-circuit anomaly.

When the power consumption of the EHC 36 and the power consumption of the step-down converter 66 are adjusted by opening and closing the relay 62 without using the motor generator 50, the driver cannot feel the vehicle decelerating. Additionally, the relay 62 may be welded.

Second Embodiment

The second embodiment will now be described with reference to the drawings, focusing on the difference from the first embodiment.

In the first embodiment, when the intake air amount Ga is small, the EHC supply upper limit electric power Pth has a small value. Thus, the duty cycle D needs to be small. This may make it difficult to set the electric power supplied to the step-down converter 66 to the required electric power Pd because of the limitation of a rated current of the step-down converter 66 and a rated current of the motor generator 50.

In the present embodiment, a lock-up clutch 52b is operated in addition to the processes shown in FIG. 2 to execute processes for maximizing the intake air amount Ga.

Figure 4:
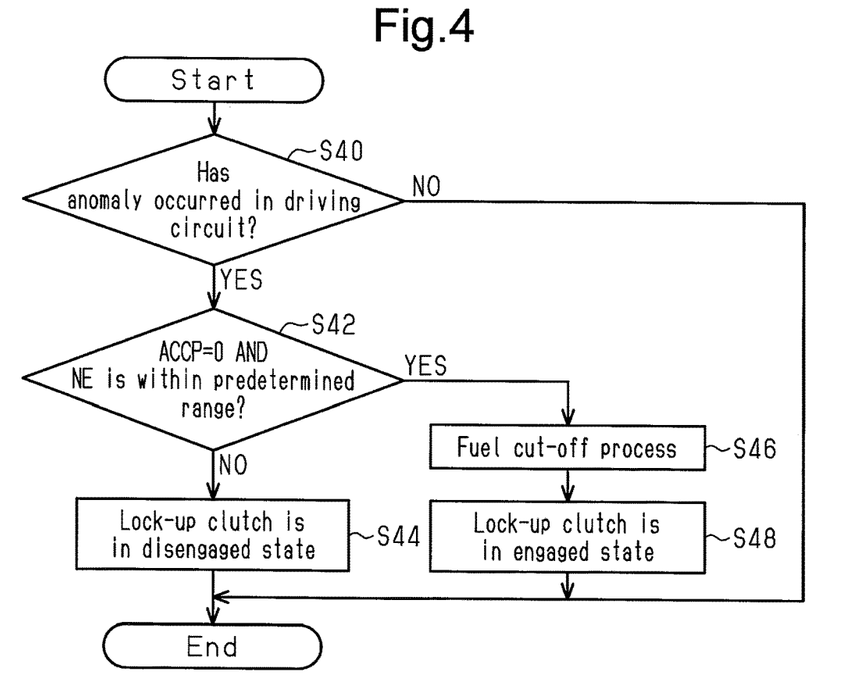
FIG. 4 is a flowchart illustrating a procedure for processes executed by a vehicle controller according to a second embodiment.

FIG. 4 illustrates a procedure for the processes. The processes illustrated in FIG. 4 are implemented when the CPU 82 repeatedly executes the program stored in the ROM 84, for example, in a predetermined cycle.

In a series of processes shown in FIG. 4, the CPU 82 first determines whether a short-circuit anomaly has occurred in the driving circuit 70 (S40). When determining that a short-circuit anomaly has occurred in the driving circuit 70 (S40: YES), the CPU 82 determines that two conditions, namely, a condition in which the accelerator operation amount ACCP is zero and a condition in which the rotational speed NE of the crankshaft 26 is within a predetermined range, have been both satisfied (S42). This process is to determine whether the condition of executing a fuel cut-off process of stopping fuel injection by the fuel injection valve 22 and stopping combustion control in the combustion chamber 20 is satisfied. The rotational speed NE is calculated by the CPU 82 based on the output signal Srn.

When determining that either one of the two conditions has not been satisfied (S42: NO), the CPU 82 determines that the condition of executing the fuel cut-off process has not been satisfied and sets the lock-up clutch 52b to a disengaged state (S44). This process is intended to increase the intake air amount Ga as compared to when the lock-up clutch 52b is set to an engaged state by increasing the rotational speed NE so as to compensate for the loss of the rotation speed transmitted to the input shaft 54a due to slipping of the automatic transmission.

When determining that both of the two conditions have been satisfied (S42: YES), the CPU 82 executes the fuel cut-off process (S46) and sets the lock-up clutch 52b to the engaged state (S48). The lock-up clutch 52b is switched to the engaged state for the following reason. The rotational speed NE of the crankshaft 26 easily decreases during the fuel cut-off process. Thus, a decrease in the rotational speed NE can be further limited by engaging the lock-up clutch 52b so that the crankshaft 26 is rotated by the driven wheels 56.

When completing the process of S44 or S48 or making a negative determination in the process of S40, the CPU 82 ends the series of processes shown in FIG. 4.

Thus, in the present embodiment, when a short-circuit anomaly has occurred in the driving circuit 70, the control of the lock-up clutch 52b is switched to control that is only performed during the occurrence of a short-circuit anomaly. This maximizes the rotational speed NE and consequently maximizes the EHC supply upper limit electric power Pth. As a result, the duty cycle D is maximized. This consequently allows the required electric power Pd of the step-down converter 66 to be easily obtained. In addition, the driver feels the vehicle decelerating to a larger extent. During a normal time in which a negative determination is made in the process of S10, the CPU 82 sets the lock-up clutch 52b to the engaged state as control of the lock-up clutch 52b when, for example, the accelerator operation amount ACCP is greater than zero by a predetermined amount.

Third Embodiment

The third embodiment will now be described with reference to the drawings, focusing on the difference from the first embodiment.

In the first and second embodiments, the idling process is executed when the accelerator operation amount ACCP is zero. During this process, since the rotational speed NE is small, the intake air amount Ga is small. As a result, the duty cycle D needs to be small. This may make it difficult to supply the required electric power Pd of the step-down converter 66.

In the present embodiment, the following processes are executed in addition to the processes of FIG. 2.

Figure 5:
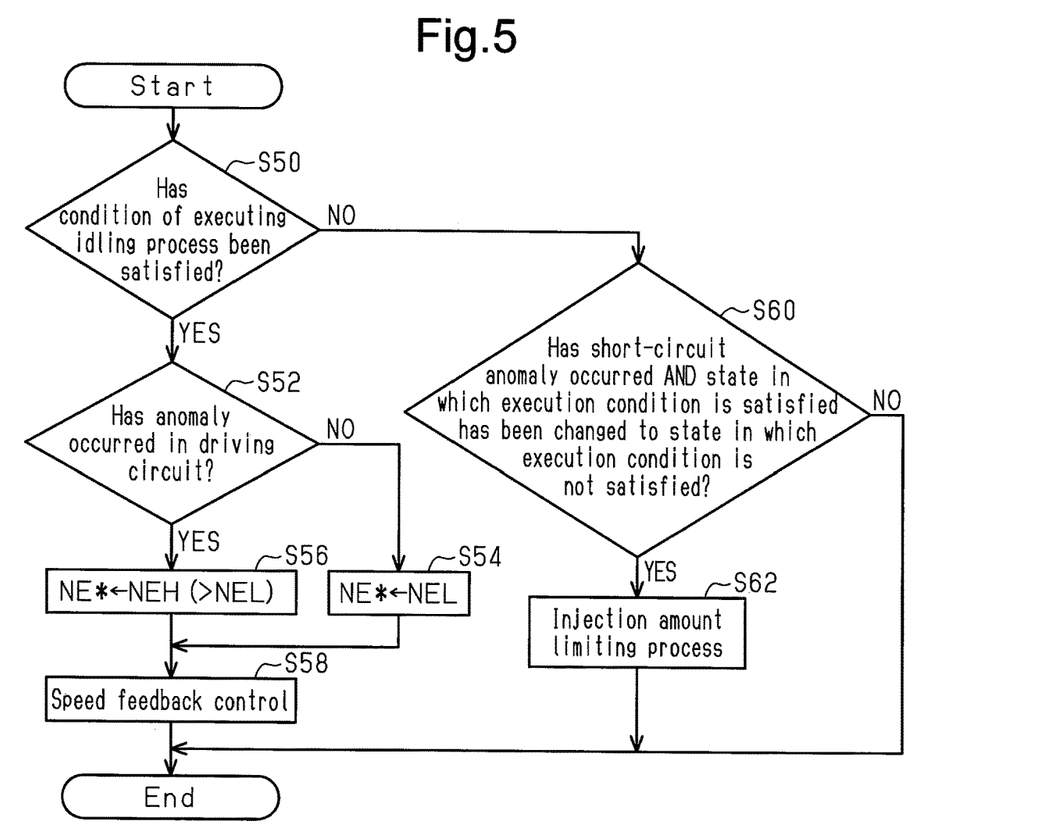
FIG. 5 is a flowchart illustrating a procedure for processes executed by a vehicle controller according to a third embodiment.

FIG. 5 illustrates a procedure for the processes executed by the vehicle controller 80. The processes illustrated in FIG. 5 are implemented when the CPU 82 repeatedly executes the program stored in the ROM 84, for example, in a predetermined cycle.

In a series of processes shown in FIG. 5, the CPU 82 first determines whether the condition of executing the idling process has been satisfied (S50). The CPU 82 determines that the execution condition has been satisfied when, for example, some conditions such as the condition in which the accelerator operation amount ACCP is zero have been satisfied. When determining that the execution condition has been satisfied (S50: YES), the CPU 82 determines whether a short-circuit anomaly has occurred in the driving circuit 70 (S52). When determining that no short-circuit anomaly has occurred (S52: NO), the CPU 82 substitutes a normal speed NEL into a target rotational speed NE*, which is a target value of the rotational speed NE (S54). When determining that a short-circuit anomaly has occurred (S52: YES), the CPU 82 substitutes the anomaly speed NEH, which is larger than the normal speed NEL, into the target rotational speed NE* (S56).

When completing the processes of S54 or S56, the CPU 82 controls the amount of fuel injected from the fuel injection valve 22 by outputting an operation signal MS1 to the fuel injection valve 22 in order to perform feedback control on the rotational speed NE to the target rotational speed NE* (S58).

When making a negative determination in the process of S50, the CPU 82 determines whether a short-circuit anomaly has occurred and whether a state in which the condition of executing the idling process is satisfied has been changed to a state in which the execution condition is not satisfied (S60). When determining that the state of the execution condition has been changed (S60: YES), the CPU 82 limits the injection amount of the fuel injection valve 22 to be small relative to an injection amount determined by the accelerator operation amount ACCP and the rotational speed NE during the normal time, in which no short-circuit anomaly has occurred (S62). This process is executed taking into account the possibility that the driver feels the vehicle abruptly accelerating when the idle rotational speed control is stopped from a state in which the target rotational speed NE* is high.

When completing the process of S58 or S62 or making a negative determination in the process of S60, the CPU 82 ends the series of processes shown in FIG. 5.

Fourth Embodiment

The fourth embodiment will now be described with reference to the drawings, focusing on the difference from the first embodiment.

In the first to third embodiments, when the intake air amount Ga is small, the EHC supply upper limit electric power Pth has a small value. Thus, the duty cycle D needs to be small. This may make it difficult to supply the required electric power Pd of the step-down converter 66.

In the present embodiment, the urea solution addition valve 46 is used to increase the amount of urea solution that passes through the EHC 36. This prevents a temperature increase in a member located proximate to the EHC 36.

Figure 6:
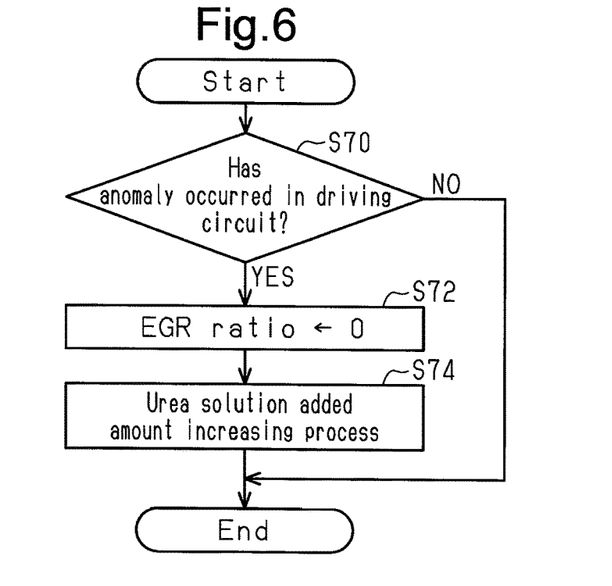
FIG. 6 is a flowchart illustrating a procedure for processes executed by a vehicle controller according to a fourth embodiment.

FIG. 6 illustrates a procedure for the processes. The processes illustrated in FIG. 6 are implemented when the CPU 82 repeatedly executes the program stored in the ROM 84, for example, in a predetermined cycle.

In a series of processes shown in FIG. 6, the CPU 82 first determines whether a short-circuit anomaly has occurred in the driving circuit 70 (S70). When determining that a short-circuit anomaly has occurred in the driving circuit 70 (S70: YES), the CPU 82 sets the EGR ratio to zero in order to increase the concentration of NOx in exhaust gas, which is to be reduced in the SCR catalyst 38 (S72). Then, the CPU 82 increases the amount of urea solution added from the urea solution addition valve 46 in order to sufficiently reduce NOx in the exhaust gas when the EGR ratio is zero (S74).

When completing the process of S74 or making a negative determination in the process of S70, the CPU 82 ends the series of processes shown in FIG. 6.

Thus, in the present embodiment, the CPU 82 increases the amount of urea solution to limit temperature increases in the EHC 36 and the SCR catalyst 38. The CPU 82 does not simply increase the added amount of urea solution but also increases the concentration of NOx in exhaust gas. Accordingly, the amount of added urea solution does not increase excessively. This prevents deposits resulting from urea solution from being deposited in the exhaust passage 30 and an excessive amount of ammonia from flowing to the downstream side of the SCR catalyst 38.

Correspondence

The correspondence between the matters in the above-described embodiment and the matters described in the section SUMMARY is as follows. Hereinafter, the correspondence relationship is shown for every number in the example described in the section SUMMARY.

In Example 1, the battery corresponds to the high-voltage battery 64, the catalyst corresponds to the SCR catalyst 38, the breaking circuit corresponds to the relay 62, the electric generator corresponds to the motor generator 50 and the three-phase inverter 60, and the vehicle controller corresponds to the vehicle controller 80. The anomaly determination process corresponds to the process of S12, the breaking process corresponds to the process of S14, and the duty cycle control process corresponds to the processes of S24 to S30.

Example 2 corresponds to the process illustrated in FIG. 3.

In Example 3, the disengagement process corresponds to the process of S44.

In Example 4, the stop process corresponds to the process of S48.

In Example 5, the idling process corresponds to the process of S58, the setting process corresponds to the processes of S52 to S56, and the amount decreasing process corresponds to the processes of S60 and S62.

In Example 6, the valve operation process corresponds to the process of S72, and the amount increasing process corresponds to the process of S74.

Modifications

The above-described embodiments may be modified as described below. The above-described embodiments and the following modifications may be implemented in combination with each other as long as technical contradiction does not occur.

Duty Cycle Limiting Process

In the first embodiment, the EHC supply upper limit electric power Pth is calculated based on the intake air amount Ga and the EHC temperature Tehc. Instead, for example, the EHC supply upper limit electric power Pth may be variably set based on only one of the two parameters, i.e., the intake air amount Ga and the EHC temperature Tehc.

In the first embodiment, the specified voltage Vh, which is applied to the EHC 36 by the three-phase inverter 60, has a fixed value. Instead, for example, the specified voltage Vh may be set to a larger value when the EHC supply upper limit electric power Pth is large than when the EHC supply upper limit electric power Pth is small. In this case, when the required electric power Pd of the step-down converter 66 is zero, the specified voltage Vh may be lower than the operation ensuring lower limit voltage Vth.

In the first embodiment, the power consumption of the EHC 36 is controlled to the EHC supply upper limit electric power Pth. Instead, for example, a required value of the power consumption of the EHC 36 may be calculated in accordance with the temperature of the SCR catalyst 38, and the smaller one of the required value and the EHC supply upper limit electric power Pth may be used as the power consumption of the EHC 36. In this case, the EHC supply upper limit electric power Pth may be calculated based on the intake air amount Ga without using the temperature of the EHC 36. In this case, the duty cycle D simply needs to be zero during a period in which the required electric power Pd of the step-down converter 66 is zero and the required value of the power consumption of the EHC 36 is zero.

For example, when the operation ensuring lower limit voltage Vth at the step-down converter 66 is slightly higher than the terminal voltage at the low-voltage battery 68, the duty cycle D can be normally set to 1 to variably set the specified voltage Vh. Nevertheless, even in this case, when the EHC supply upper limit electric power Pth is small, the specified voltage Vh is set to the operation ensuring lower limit voltage Vth and the duty cycle D is set to 1, the power consumption of the EHC 36 may be larger than the EHC supply upper limit electric power Pth. Thus, in such a case, it is effective to set the duty cycle D to be smaller than 1.

In the above-described example, the temperature of a member located proximate to the EHC 36, which serves as an input of the duty cycle control process, is the temperature of a subject to be heated. Instead, for example, the process of S18 may be changed to a process of estimating the temperature of the SCR catalyst 38. In addition to a value obtained through estimation, a temperature sensor such as a thermocouple may be arranged in the SCR catalyst 38 to use a value obtained through detection. Further, in addition to a subject to be heated, for example, the process may involve the use of the temperature of a member in an overheatable region, where overheating is possibly performed by the EHC 36, such as the temperature of a member that defines the exhaust passage. The temperature of the member in the overheatable region is desirably defined as the temperature of a portion of the member that is located in a spherical region that includes the center of gravity of the EHC 36 as the center and has a radius that is the maximum value of the length of a straight line that connects one point in the EHC 36 to one point in the SCR catalyst 38.

Stop Process

In the above-described example, the process of setting the lock-up clutch 52b to the engaged state is used in the process of S48. Instead, for example, the process may be to perform flex lock-up control in lieu of completely engaging the lock-up clutch 52b. In this control, power is transmitted while allowing for slipping at the upstream side and the downstream side of the lock-up clutch 52b.

In the second embodiment, the stop process is executed when the fuel cut-off process is executed. Instead, for example, when a short-circuit anomaly has occurred, the process of S44 may be executed in a case in which the vehicle is in a constant-speed traveling state or a gradual accelerating state, which differs from an accelerating state in which the vehicle does not suddenly accelerate, and the process of S48 may be executed in other states. This is achieved when the CPU 82 determines that, for example, the vehicle is in the gradual accelerating state or the constant-speed traveling state in a case in which the accelerator operation amount ACCP is greater than or equal to a first threshold value, which is larger than zero, and less than or equal to a second threshold value, which is larger than the first threshold value. In addition, for example, when a short-circuit anomaly has occurred, the process of S44 may be executed when the CPU 82 determines that the vehicle is in the gradual accelerating state or the constant-speed traveling state, and the control of the lock-up clutch 52b may be executed in other states.

Valve Operation Process

In the fourth embodiment, when the CPU 82 determines that an anomaly has occurred in the driving circuit 70, the EGR valve 42 is operated to set the EGR ratio to zero. Instead, for example, the EGR ratio may be a value that is larger than zero and smaller than a normal value. That is, for example, when the EGR ratio is variably set based on an operating point, which is determined from the rotational speed NE and the injection amount, the EGR ratio may be smaller than a normal EGR ratio, which is determined from the operating point.

In the above-described embodiments, when a short-circuit anomaly has occurred, the EGR ratio is constantly set to be smaller than a normal EGR ratio. Instead, for example, the EGR ratio may be small only when the idle rotational speed control is performed.

Amount Increasing Process

In the fourth embodiment, the amount of urea solution is increased on the condition that an affirmative determination is made in the process of S70. Instead, for example, in a case in which the amount of urea solution added per unit of time is the amount of urea solution that can react with NOx in exhaust gas without excess or deficiency, the amount of urea solution increases as a result of the process of S72 when the amount of urea solution is calculated based on the detection value of the NOx concentration in exhaust gas.

In the above-described embodiments, the exhaust purifier includes the oxidation catalyst 32, the DPF 34, and the SCR catalyst 38. Instead, the exhaust purifier may include only the DPF 34 and the SCR catalyst 38. Further, the exhaust purifier may include, for example, a NOx occlusion reduction catalyst (NSR: NOx storage reduction) arranged at the upstream side of the DPF 34. Further, the exhaust purifier may include the DPF 34 and the NSR, and the SCR catalyst may be omitted from the exhaust purifier. In this case, the NSR catalyst may be arranged at the downstream side of the DPF 34, and the heated catalyst may be the NSR catalyst. However, the heated catalyst does not necessarily have to be arranged at the downstream side of the DPF 34.

Vehicle Controller

The vehicle controller does not have to include the CPU 82 and the ROM 84 to execute software processing. For example, at least part of the processes executed by the software in the above-described embodiment may be executed by hardware circuits dedicated to executing these processes (such as ASIC). That is, the vehicle controller may be modified as long as it has any one of the following configurations (a) to (c): (a) A configuration including a processor that executes all of the above-described processes according to programs and a program storage device such as a ROM that stores the programs; (b) A configuration including a processor and a program storage device that execute part of the above-described processes according to the programs and a dedicated hardware circuit that executes the remaining processes; and (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller configured to control a vehicle, the vehicle comprising an internal combustion engine capable of transmitting rotational power of a crankshaft to a driven wheel; a catalyst arranged in an exhaust passage of the internal combustion engine; a heater configured to generate heat by consuming electric power with the catalyst as a subject to be heated;
   a driving circuit configured to supply the heater with electric power of a battery; a breaking circuit configured to break an electrical path between the battery and the driving circuit; and an electric generator configured to convert the rotational power of the crankshaft into electric power and supply the driving circuit with the electric power, wherein the vehicle controller is configured to execute:
   an anomaly determination process of determining whether an anomaly where power is constantly supplied from the battery to the heater has occurred in the driving circuit;
   a breaking process of breaking the electrical path by operating the breaking circuit when determining that the anomaly has occurred in the driving circuit; and
   a duty cycle control process of alternately repeating an electric power generation execution period, during which the electric generator generates power, and an electric power generation stop period, during which the electric generator does not generate power, and controlling a duty cycle, which is a ratio of the electric power generation execution period to a single cycle of repeated cycles, when determining that the anomaly has occurred in the driving circuit, wherein the duty cycle control process includes at least one of two processes, which are a process of setting the duty cycle to be larger when a member in an overheatable region, in which overheating is possibly performed by the heater, has a low temperature than when the member has a high temperature and a process of setting the duty cycle to be larger when the internal combustion engine has a large intake air amount than when the internal combustion engine has a small intake air amount;
   an idling process of controlling a rotational speed of the crankshaft of the internal combustion engine to a target rotational speed when an accelerator operation amount is zero;
   a setting process of setting the target rotational speed to be a larger value when determining that the anomaly has occurred in the driving circuit than when determining that the anomaly has not occurred in the driving circuit; and an amount decreasing process of decreasing an amount of fuel injected from a fuel injection valve of the internal combustion engine to a larger extent in a case in which the idling process is stopped to switch to control corresponding to the accelerator operation amount when determining that the anomaly has occurred in the driving circuit than in a case in which the idling process is stopped to switch to control corresponding to the accelerator operation amount when determining that the anomaly has not occurred in the driving circuit.

2. The vehicle controller according to claim 1, wherein the battery is a high-voltage battery, the vehicle includes
 a low-voltage battery having a lower terminal voltage than the high-voltage battery, and
 a step-down converter configured to step down an output voltage at the electric generator and apply the output voltage to the low-voltage battery, the step-down converter is capable of outputting electric power to the low-voltage battery when a terminal voltage at the electric generator is greater than or equal to an operation ensuring lower limit voltage, and the duty cycle control process includes setting the duty cycle such that the output voltage at the electric generator in the electric power generation execution period is greater than or equal to the operation ensuring lower limit voltage.

3. The vehicle controller according to claim 1, wherein the vehicle includes a torque converter connected to the crankshaft and provided with a lock-up clutch, and the vehicle controller is configured to execute a disengagement process of setting the lock-up clutch to a disengaged state when determining that the anomaly has occurred in the driving circuit.

4. The vehicle controller according to claim 3, wherein the vehicle controller is configured to execute:
 a fuel cut-off process of stopping combustion control in the internal combustion engine on a condition that an accelerator operation amount is zero; and
 a stop process of stopping the disengagement process in a case in which the fuel cut-off process has been executed even when determining that the anomaly has occurred in the driving circuit.

5. The vehicle controller according to claim 1, wherein the member in the overheatable region is an exhaust passage member.

6. The vehicle controller according to claim 1, wherein the anomaly is that the driving circuit improperly constantly supplies power from the battery to the heater.

7. A vehicle controller configured to control a vehicle, the vehicle comprising an internal combustion engine capable of transmitting rotational power of a crankshaft to a driven wheel; a catalyst arranged in an exhaust passage of the internal combustion engine; a heater configured to generate heat by consuming electric power with the catalyst as a subject to be heated;
 a driving circuit configured to supply the heater with electric power of a battery; a breaking circuit configured to break an electrical path between the battery and the driving circuit; and an electric generator configured to convert the rotational power of the crankshaft into electric power and supply the driving circuit with the electric power, wherein the vehicle controller is configured to execute:

an anomaly determination process of determining whether an anomaly where power is constantly supplied from the battery to the heater has occurred in the driving circuit;

a breaking process of breaking the electrical path by operating the breaking circuit when determining that the anomaly has occurred in the driving circuit; and a duty cycle control process of alternately repeating an electric power generation execution period, during which the electric generator generates power, and an electric power generation stop period, during which the electric generator does not generate power, and controlling a duty cycle, which is a ratio of the electric power generation execution period to a single cycle of repeated cycles, when determining that the anomaly has occurred in the driving circuit, wherein the duty cycle control process includes at least one of two processes, which are a process of setting the duty cycle to be larger when a member in an overheatable region, in which overheating is possibly performed by the heater, has a low temperature than when the member has a high temperature and a process of setting the duty cycle to be larger when the internal combustion engine has a large intake air amount than when the internal combustion engine has a small intake air amount; wherein the internal combustion engine includes
 an exhaust gas recirculation (EGR) passage configured to cause exhaust gas discharged to the exhaust passage to flow into an intake passage, and
 an EGR valve configured to adjust a cross-sectional flow area of the EGR passage, the catalyst is a selective catalytic reduction catalyst, the vehicle includes a urea solution addition valve configured to add urea solution to exhaust gas in a section located at an upstream side of the catalyst, and the vehicle controller is configured to execute:
a valve operation process of operating the EGR valve in order to set an EGR ratio to be smaller when determining that the anomaly has occurred in the driving circuit than when determining that the anomaly has not occurred in the driving circuit; and an amount increasing process of increasing an amount of the urea solution added from the urea solution addition valve to a larger extent when the valve operation process is executed than when the valve operation process is not executed.

8. The vehicle controller according to claim 7, wherein the battery is a high-voltage battery, the vehicle includes
 a low-voltage battery having a lower terminal voltage than the high-voltage battery, and
 a step-down converter configured to step down an output voltage at the electric generator and apply the output voltage to the low-voltage battery, the step-down converter is capable of outputting electric power to the low-voltage battery when a terminal voltage at the electric generator is greater than or equal to an operation ensuring lower limit voltage, and the duty cycle control process includes setting the duty cycle such that the output voltage at the electric generator in the electric power generation execution period is greater than or equal to the operation ensuring lower limit voltage.

9. The vehicle controller according to claim 7, wherein the vehicle includes a torque converter connected to the crankshaft and provided with a lock-up clutch, and the vehicle controller is configured to execute a disengagement process of setting the lock-up clutch to a disengaged state when determining that the anomaly has occurred in the driving circuit.

10. The vehicle controller according to claim 9, wherein the vehicle controller is configured to execute:
a fuel cut-off process of stopping combustion control in the internal combustion engine on a condition that an accelerator operation amount is zero; and
a stop process of stopping the disengagement process in a case in which the fuel cut-off process has been executed even when determining that the anomaly has occurred in the driving circuit.

11. The vehicle controller according to claim 7, wherein the member in the overheatable region is an exhaust passage member.

12. The vehicle controller according to claim 7, wherein the anomaly is that the driving circuit improperly constantly supplies power from the battery to the heater.

* * * * *